(12) United States Patent
Sumiyoshi (10) Patent No.: US 12,499,905 B2
(45) Date of Patent: Dec. 16, 2025

(54) EMOTION RECOGNITION SYSTEM AND EMOTION RECOGNITION METHOD

(71) Applicant: Hitachi, Ltd., Tokyo (JP)

(72) Inventor: Takashi Sumiyoshi, Tokyo (JP)

(73) Assignee: HITACHI, LTD., Tokyo (JP)

(*) Notice: Subject to any disclaimer, the term of this patent is extended or adjusted under 35 U.S.C. 154(b) by 439 days.

(21) Appl. No.: 17/963,222

(22) Filed: Oct. 11, 2022

(65) Prior Publication Data

US 2023/0141724 A1    May 11, 2023

(30) Foreign Application Priority Data

Nov. 11, 2021    (JP) .................. 2021-183862

(51) Int. Cl.
*G10L 25/63* (2013.01)
*G10L 17/26* (2013.01)
*G10L 25/30* (2013.01)

(52) U.S. Cl.
CPC .............. *G10L 25/63* (2013.01); *G10L 17/26* (2013.01); *G10L 25/30* (2013.01)

(58) Field of Classification Search
CPC ......... G10L 25/63; G10L 17/26; G10L 25/30; G10L 25/03; G10L 25/27; G10L 25/51
See application file for complete search history.

(56) References Cited

U.S. PATENT DOCUMENTS

| | | | |
|---|---|---|---|
| 9,300,790 B2 | 3/2016 | Gainsboro et al. | |
| 10,325,601 B2* | 6/2019 | Khoury | G10L 17/04 |
| 11,922,934 B2* | 3/2024 | Luan | G10L 15/22 |
| 2018/0165582 A1* | 6/2018 | Cha | H04L 51/52 |
| 2019/0130910 A1 | 5/2019 | Kariya et al. | |
| 2020/0075040 A1 | 3/2020 | Provost et al. | |
| 2021/0134300 A1* | 5/2021 | Yamamoto | G10L 17/04 |
| 2022/0059122 A1 | 2/2022 | Xiu et al. | |

FOREIGN PATENT DOCUMENTS

| | | |
|---|---|---|
| JP | 2018-132623 A | 8/2018 |
| WO | 2017/187712 A1 | 11/2017 |
| WO | 2020/190395 A1 | 9/2020 |

OTHER PUBLICATIONS

Communication pursuant to Article 94(3) EPC received in corresponding European Application No. 22205114.6 dated Jul. 4, 2024.
Extended European Search Report received in corresponding European Application No. 22205114.6 dated Feb. 23, 2023.
Japanese Office Action received in corresponding Japanese Application No. 2021-183862 dated Mar. 18, 2025.

* cited by examiner

*Primary Examiner* — Daniel C Washburn
*Assistant Examiner* — Penny L Caudle
(74) *Attorney, Agent, or Firm* — MATTINGLY & MALUR, PC (57) ABSTRACT

An emotion recognition system includes an input unit configured to input first speech data and second speech data, and a processing unit configured to input the first speech data and the second speech data to a differential-emotion recognition model that infers a differential emotion between two pieces of speech data, and acquire, from the differential-emotion recognition model, differential-emotion information indicating a differential emotion between the first speech data and the second speech data.

10 Claims, 8 Drawing Sheets

FIG. 2

| SPEECH ID | SPEAKER ID | SPEECH WAVEFORM |
|---|---|---|
| 1 | 1 | |
| 2 | 1 | |
| 3 | 2 | |

FIG. 3

| FIRST SPEECH ID | SECOND SPEECH ID | DIFFERENTIAL EMOTION |
|---|---|---|
| 1 | 2 | 0.1 |
| 2 | 1 | -1.0 |

| SPEECH SECTION ID | SPEECH SECTION DATA | EMOTION TRANSITION |
|---|---|---|
| 1 | [0:10—0:13] | 0.0 |
| 2 | [0:20—0:25] | 0.2 |
| 3 | [0:28—0:33] | -0.2 |

EMOTION RECOGNITION SYSTEM AND EMOTION RECOGNITION METHOD

CROSS-REFERENCE TO RELATED APPLICATION

The present application claims priority from Japanese application JP2021-183862, filed on Nov. 11, 2021, the contents of which is hereby incorporated by reference into this application.

BACKGROUND OF THE INVENTION

1. Field of the Invention

The present invention generally relates to a technique for inferring emotions expressed in speech.

2. Description of the Related Art

Emotion information included in human speech plays an important role in human communication. There is a possibility that whether a purpose of communication has been achieved can be determined by movement of emotions, which creates a demand for analyzing emotions in communication. In business situations such as daily sales activities and reception operations at a call center, it is necessary to analyze emotions in a lot of speech-based communication. Thus, speech emotion recognition by a machine is desired.

The speech emotion recognition outputs categories of emotions included in input speech or a degree for each emotion category for the speech. As a mechanism thereof, there are a method of performing classification or regression analysis from features of speech signals in accordance with a predetermined rule, and a method of obtaining such a rule by machine learning.

In recent years, a speech interaction apparatus capable of easily performing emotion recognition according to a user has been disclosed (see JP 2018-132623 A).

SUMMARY OF THE INVENTION

In a rule-based method, a result that is output on the basis of one piece of speech data depends on a rule or a threshold set by a developer. In a machine learning method, a parameter is determined on the basis of speech data collected for training and a labeling result by a person (labeler) who labels the speech data with emotional impressions received by listening to that speech data as correct values. However, in any case, determination is made depending on subjectivity of the minority such as a developer or a labeler, so that an output of an emotion recognition device may deviate from an actual user impression.

The present invention has been made in view of the above points, and an object of the present invention is to propose an emotion recognition system and the like capable of appropriately recognizing emotions expressed in speech.

In order to solve such a problem, the present invention includes an input unit configured to input first speech data and second speech data, and a processing unit configured to input the first speech data and the second speech data to a differential-emotion recognition model that infers a differential emotion between two pieces of speech data, and acquire, from the differential-emotion recognition model, differential-emotion information indicating a differential emotion between the first speech data and the second speech data.

In the above configuration, for example, since the differential emotion (that is, relative emotion) is inferred from the two pieces of speech data, an emotion recognized by the emotion recognition system can be closer to an actual user impression than an emotion inferred from one piece of speech data (that is, absolute emotion).

According to the present invention, it is possible to implement an emotion recognition system that recognizes emotions expressed in speech with high accuracy. Problems, configurations, and advantageous effects other than those described above will be clarified by the following description of embodiments.

DESCRIPTION OF THE PREFERRED EMBODIMENTS

(I) First Embodiment

Hereinafter, embodiments of the present invention will be described in detail. However, the present invention is not limited to the embodiments.

In a conventional technique, there is a possibility that an unintended result is output because a rule functions incorrectly due to influence of a variable factor of speaker characteristics in input speech, a variable factor of environmental characteristics in input speech, and the like. Recently, the advent of deep learning allows for handling more complicated rules in machine learning, and efforts have been widely made to solve this problem. Although the accuracy has been improved, it is difficult to say that the problem has been sufficiently solved.

In this regard, an emotion recognition system according to the present embodiment compares speech data within an individual rather than between individuals to recognize speech emotions. The speech emotions are the inside of a person expressed as a voice, including delight, anger, sorrow, and pleasure, negativeness or positiveness, and the like. The emotion recognition system uses an emotion label given by listening to two speech patterns of a certain person (a label of differential assessment (relative assessment) that quantifies emotions grasped from the two speech patterns of the person) rather than an emotion label given by listening to a single speech pattern of a certain person (a label of absolute assessment that quantifies current emotions, for example, the person is happy or sad). Thus, the labeling work is easy for labelers, and the label of the differential assessment is more reliable than the label of the absolute assessment. The two speech patterns used by the emotion recognition system to infer emotions come from the same speaker, but may be discontinuous. However, it is desirable to use speech patterns acquired on the same day and/or at the same place.

According to the emotion recognition system, it is possible to recognize speech emotions based on a difference between speech patterns of the same person while suppressing the influence of the speaker characteristics and the environmental characteristics as compared with the related art.

Next, the embodiments of the present invention will be described with reference to the drawings. The following description and drawings are examples for explaining the present invention, and some parts are omitted and simplified as appropriate for the sake of clarity of explanation. The present invention can also be implemented in various other forms. Unless otherwise specified, each constituent element may be singular or plural. In the following description, the same elements are denoted by the same reference numerals in the drawings, and the description thereof will be omitted as appropriate.

Expressions such as "first", "second", and "third" in the present specification are used to identify constituent elements, and do not necessarily limit the number or order of the constituent elements. In addition, reference numerals for identifying constituent elements are used in each context, and a reference numeral used in one context does not necessarily indicate the same configuration in another context. Furthermore, a constituent element identified by a certain reference numeral is not hindered from concurrently serving a function of a constituent element identified by another reference numeral.

Figure 1:
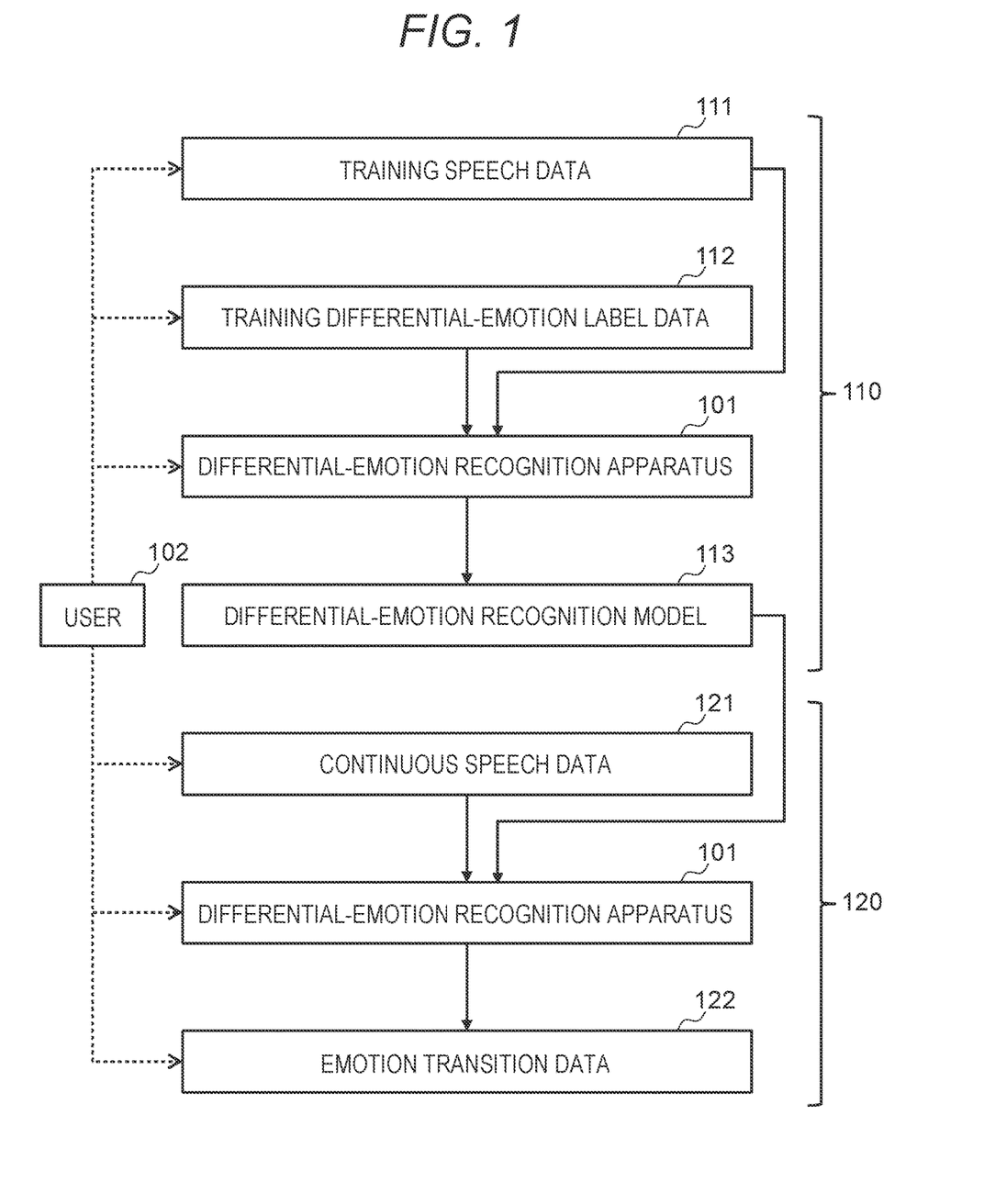
FIG. 1 is a diagram illustrating an example of a processing flow of a differential-emotion recognition apparatus according to a first embodiment.

FIG. 1 is a diagram illustrating an example of a processing flow of a differential-emotion recognition apparatus 101 according to the present embodiment.

First, in a training phase 110, a user 102 prepares training speech data 111 and training differential-emotion label data 112. Next, the user 102 uses the differential-emotion recognition apparatus 101 to generate a differential-emotion recognition model 113 by training.

Next, in an inference phase 120, the user 102 inputs continuous speech data 121 to the differential-emotion recognition apparatus 101 and acquires emotion transition data 122.

Figure 2:
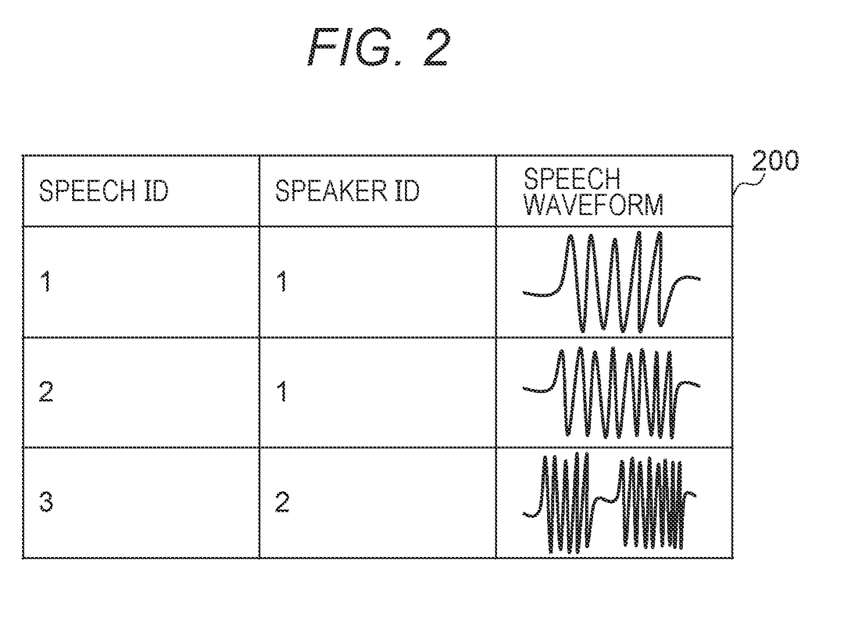
FIG. 2 is a diagram illustrating an example of training speech data according to the first embodiment.

FIG. 2 is a diagram illustrating an example (training speech table 200) of the training speech data 111.

The training speech table 200 stores a plurality of speech waveforms (speech data). Each of the plurality of speech waveforms is given a speech ID and a speaker ID. The speech ID represents a code for uniquely identifying a speech waveform. The speaker ID, which is assigned to a speaker of a speech waveform, represents a code for uniquely identifying a speaker. For that matter, the training speech table 200 stores a plurality of speech waveforms of a plurality of persons.

Figure 3:
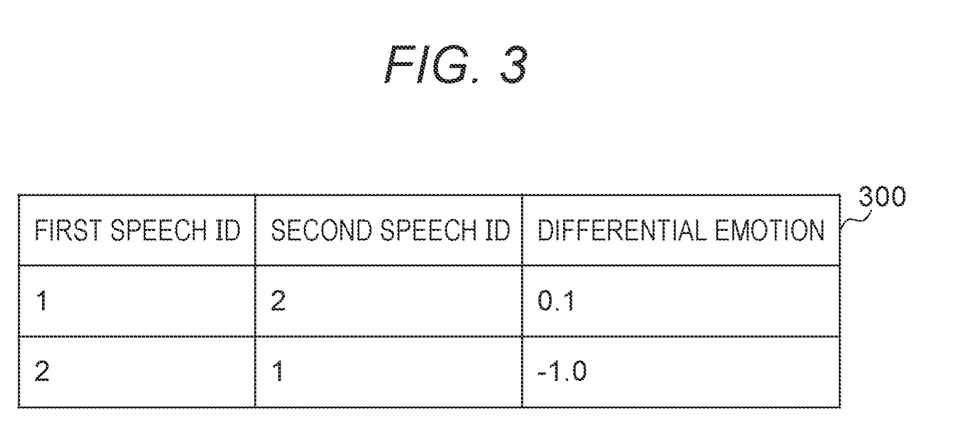
FIG. 3 is a diagram illustrating an example of training differential-emotion label data according to the first embodiment.

FIG. 3 is a diagram illustrating an example (training differential-emotion label table 300) of the training differential-emotion label data 112.

The training differential-emotion label table 300 stores a plurality of differential emotions. The differential emotion, which is given by a labeler, represents a label that quantifies an emotion of a speech pattern (second speech pattern) having a speech waveform of a second speech ID relative to a speech pattern (first speech pattern) having a speech waveform of a first speech ID. The first speech ID and the second speech ID indicate speech waveforms of the corresponding speech IDs of the training speech data 111.

It is assumed that the speech waveforms of the first speech ID and the second speech ID have the same speaker ID. The labeler gives an emotion label (of a difference value) between the two inputs. Note that a label of an absolute value of emotion for one speech pattern may be given (held in the training speech data 111) as in the related art. In training, the difference between the absolute values may be used as the difference value. For example, when absolute values "0.1" and "0.2" indicating emotions for the speech patterns of the speech IDs "1" and "2", respectively, are stored in the training speech table 200, the difference value "0.1" between the absolute value "0.1" of the first speech ID and the absolute value "0.2" of the second speech ID may be calculated as a corresponding differential emotion.

Moreover, the training differential-emotion label table 300 may store differential emotions by a plurality of labelers. In this case, a statistical value such as an average value of the differential emotions by the plurality of labelers is used in training. Furthermore, there may be multiple emotion categories instead of one. In this case, the training differential-emotion label table 300 stores a vector value as a differential emotion instead of a scalar value.

Figure 4:
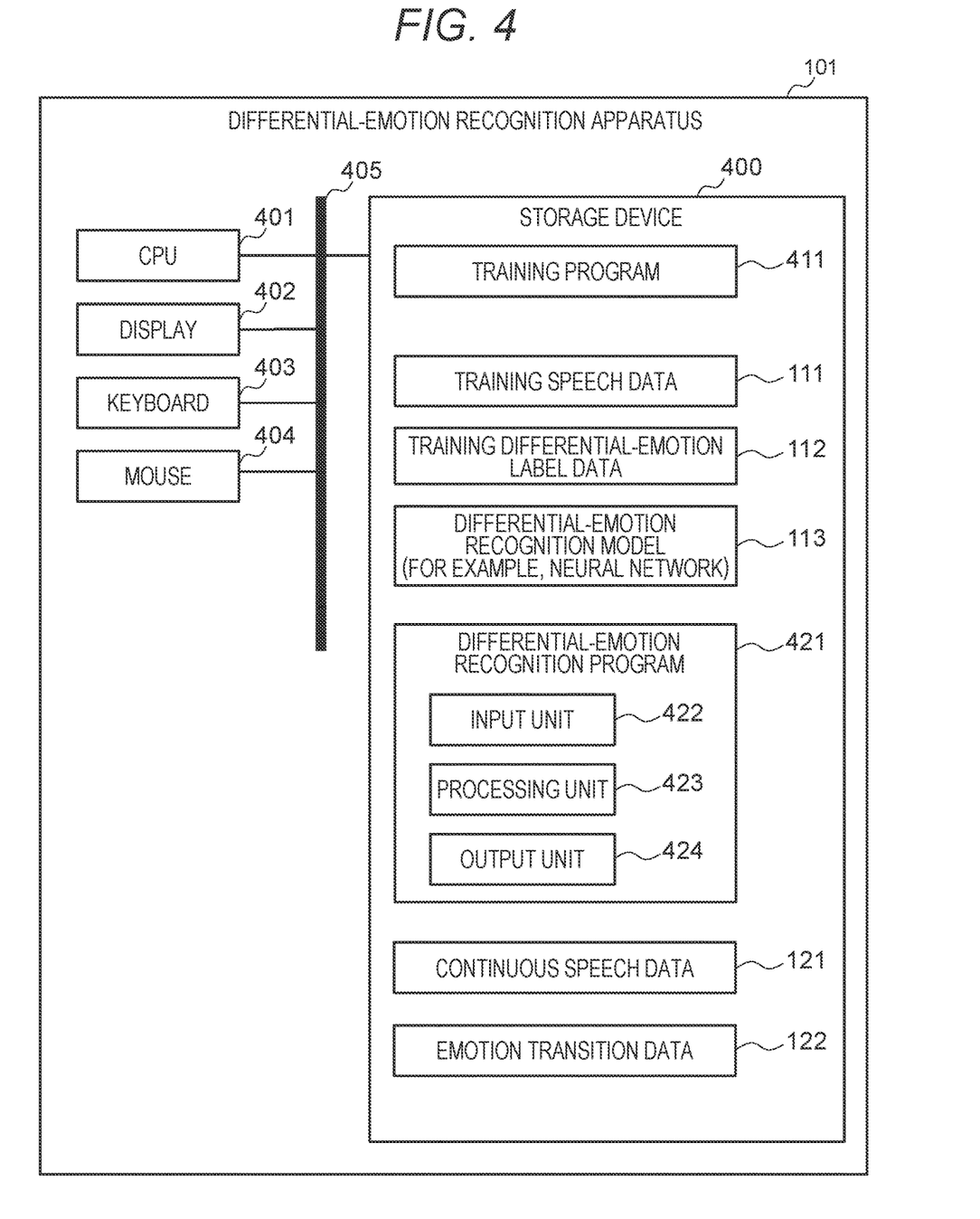
FIG. 4 is a diagram illustrating an example of a configuration of a differential-emotion recognition apparatus according to the first embodiment.

FIG. 4 is a diagram illustrating an example of a configuration of the differential-emotion recognition apparatus 101.

The differential-emotion recognition apparatus 101 includes a storage device 400, a CPU 401, a display 402, a keyboard 403, and a mouse 404 as components, like a configuration of a general personal computer (PC). Each component can transmit and receive data via a bus 405.

The storage device 400 includes a training program 411 and a differential-emotion recognition program 421 as programs. These programs are read to the CPU 401 by an operating system (OS) (not illustrated) existing in the storage device 400 at start-up to be executed.

The differential-emotion recognition model 113 is, for example, a neural network in which the number of states of an input layer is "1024" in total of the number of features of a first speech pattern "512" and the number of features of a second speech pattern "512", the number of hidden layers is one and the number of states of the hidden layer is "512", and the number of states of an output layer is "1". For the input $\{x_i (i=1 \ldots 1024)\}$ of the input layer, the value $\{h_j (j=1 \ldots 512)\}$ of the hidden layer is calculated by (Expression 1).

[Mathematical formula 1]

$$h_j = s\left(\sum_i (W^1_{ij} x_i + b^1_i)\right) \quad \text{(Expression 1)}$$

The output y of the output layer represents a difference value of emotion of the second speech pattern relative to the first speech pattern, and is calculated by (Expression 2).

[Mathematical formula 2]

$$y = s\left(\sum_i (W^2_i h_i + b^2_i)\right) \quad \text{(Expression 2)}$$

Here, s represents an activation function, for example, a sigmoid function, W represents a weight, and b represents a bias.

As a means for obtaining the features from the first speech pattern and the second speech pattern, a statistic or the like for time-series low-level descriptors (LLD), which is described in Document 1 below, can be used.

Document 1: Suzuki, "Recognition of Emotions Included in Speech", the Journal of the Acoustical Society of Japan, Vol. 71, No. 9 (2015), pp. 484-489

Note that the present embodiment does not limit the structure of the neural network. Any structure and activation function of a neural network may be used. Furthermore, the differential-emotion recognition model 113 is not limited to a neural network, and may adopt any model.

Functions of the differential-emotion recognition apparatus 101 (training program 411, differential-emotion recognition program 421, and the like) may be implemented by, for example, the CPU 401 reading a program from the storage device 400 and executing the program (software), may be implemented by hardware such as a dedicated circuit, or may be implemented by a combination of software and hardware. Note that one function of the differential-emotion recognition apparatus 101 may be divided into multiple functions, or multiple functions may be integrated into one function. For example, the differential-emotion recognition program 421 may include an input unit 422, a processing unit 423, and an output unit 424. Moreover, some of the functions of the differential-emotion recognition apparatus 101 may be provided as an alternate function or may be included in another function. Furthermore, some of the functions of the differential-emotion recognition apparatus 101 may be implemented by another computer connectable to the differential-emotion recognition apparatus 101. For example, the training program 411 may be provided in a first PC, and the differential-emotion recognition program 421 may be provided in a second PC.

Figure 5:
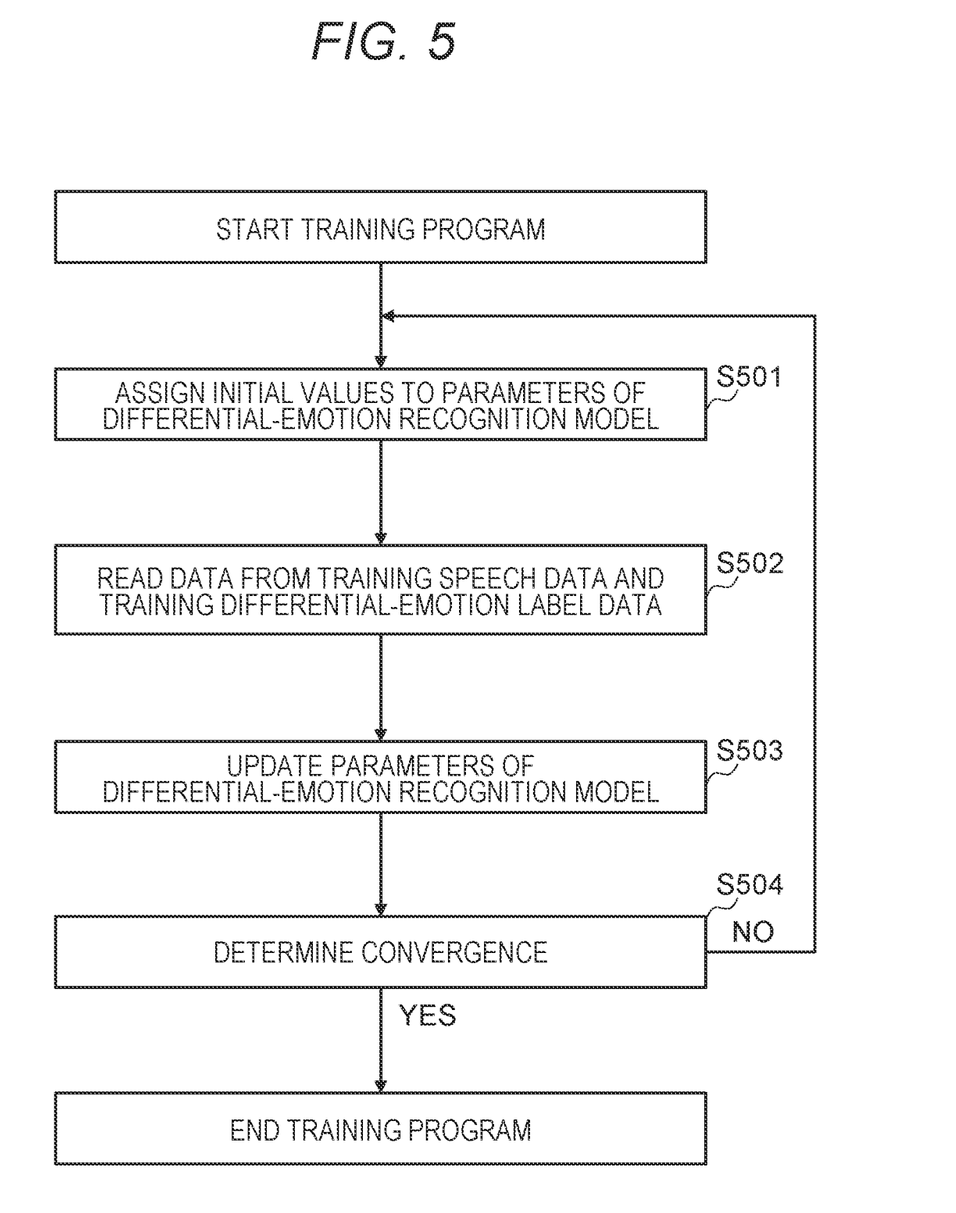
FIG. 5 is a diagram illustrating an example of a flowchart of a training program according to the first embodiment.

FIG. 5 is a diagram illustrating an example of a flowchart of the training program 411.

First, the training program 411 assigns initial values to the parameters $W_{ij}^1$, $b_i^1$, $W_i^2$, and $b_i^2$ of the differential-emotion recognition model 113 (S501). The training program 411 gives random values as the initial values for facilitating the training of the neural network.

Next, the training program 411 reads data from the training speech data 111 and the training differential-emotion label data 112 (S502).

Next, the training program 411 updates the parameters of the differential-emotion recognition model 113 (S503). As an update method, a neural network back propagation method can be used.

Next, the training program 411 determines whether the training is converged (S504). The convergence is determined under conditions that the process has been executed a predetermined fixed number of times, a value of an error function has fallen below a predetermined threshold, and the like.

Figure 6:
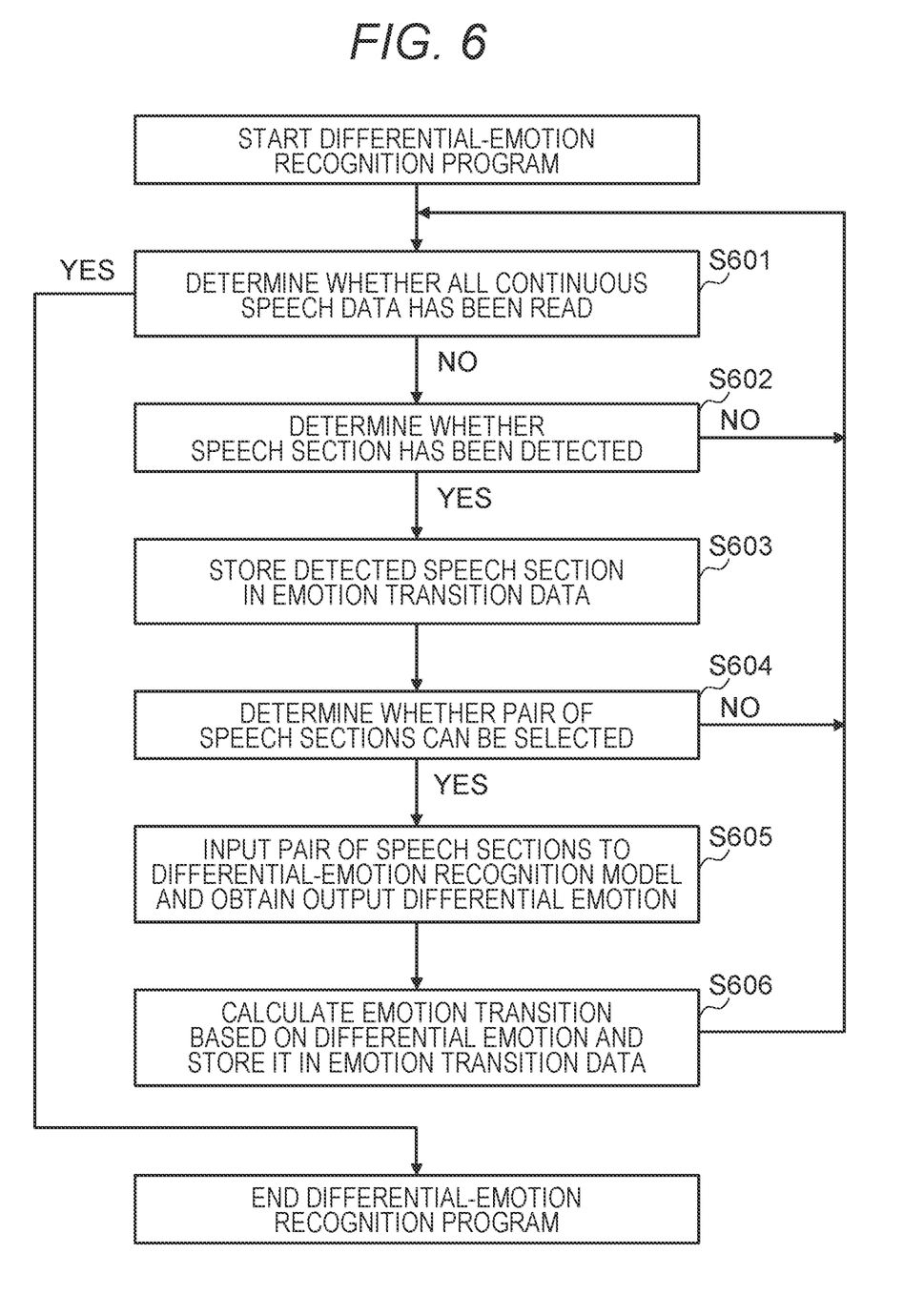
FIG. 6 is a diagram illustrating an example of a flowchart of a differential-emotion recognition program according to the first embodiment.

FIG. 6 is a diagram illustrating an example of a flowchart of the differential-emotion recognition program 421.

Before the differential-emotion recognition program 421 is executed, the user 102 or the like stores speech to be analyzed in the storage device 400 as the continuous speech data 121.

First, the differential-emotion recognition program 421 reads one frame of the continuous speech data 121. If all the continuous speech data 121 has been read (S601), the program ends.

Next, the differential-emotion recognition program 421 determines whether a speech section has been detected (S602). A known method can be used to detect a speech section. In the method, for example, when a certain number of frames with a volume level equal to or higher than a given value continue and then a certain number of frames with a volume level equal to or lower than the given value continue, a group of these frames is regarded as a speech section. When no speech sections have been detected, the process returns to S601. Note that the speech section may be a section (a group of sequential frames) in which a speech pattern is detected, or may be a section including a previous frame and/or a subsequent frame of the section in which the speech pattern is detected.

Next, the differential-emotion recognition program 421 stores information of the detected speech section in the emotion transition data 122 (S603). Note that, in S603, a speech section ID and speech section data are stored in the emotion transition data 122 and, in S606, an emotion transition is stored.

Next, the differential-emotion recognition program 421 determines whether a pair of speech sections can be selected (S604). The pair of speech sections to be selected may be, for example, a pair including temporally adjacent speech sections in the emotion transition data 122, for one of which no emotion transitions have been calculated. Here, in order to make calculation of an emotion transition robust, the differential-emotion recognition program 421 may use a plurality of pairs of speech sections within a predetermined time interval as the pair of adjacent speech sections. In addition, the differential-emotion recognition program 421 may perform processing of eliminating a pair including a speech section for which emotion recognition is considered to be difficult, such as a short speech section or a speech section with a low volume level.

Next, the differential-emotion recognition program 421 inputs a selected pair of speech sections (two pieces of speech data of the speech sections) to the differential-emotion recognition model 113, and obtains a differential emotion output from the differential-emotion recognition model 113 (S605).

Next, the differential-emotion recognition program 421 calculates an emotion transition on the basis of the differential emotion and stores the emotion transition in the emotion transition data 122 (S606). In order to obtain an emotion transition of a certain speech section, for example, the obtained differential emotion may be added to an emotion transition of the other speech section paired with that speech section for all the pairs, and obtained values may be averaged. The initial speech section may have an emotion transition of an average value "0". Thereafter, the process returns to S601.

In the configuration illustrated in FIG. 6, the differential emotion is acquired by inputting a pair of speech sections detected from the continuous speech data 121 to the differential-emotion recognition model 113. However, the present invention is not limited to this configuration. For example, the differential-emotion recognition program 421 may be configured to acquire the differential emotion by inputting two pieces of speech data designated by the user to the differential-emotion recognition model 113.

Figure 7:
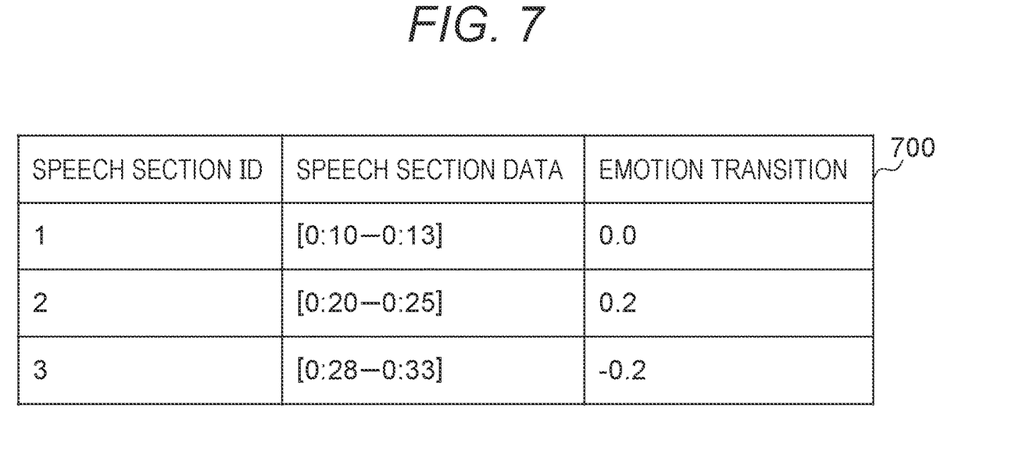
FIG. 7 is a diagram illustrating an example of emotion transition data according to the first embodiment.

FIG. 7 is a diagram illustrating an example (emotion transition table 700) of the emotion transition data 122.

The emotion transition table 700 stores an emotion transition for each speech section. The speech section ID represents a code for uniquely identifying a speech section. The speech section data represents information (for example, time section information) indicating a range of the speech section in the continuous speech data 121. The emotion transition represents an emotion transition value obtained by the differential-emotion recognition program 421 for the speech section.

Figure 8:
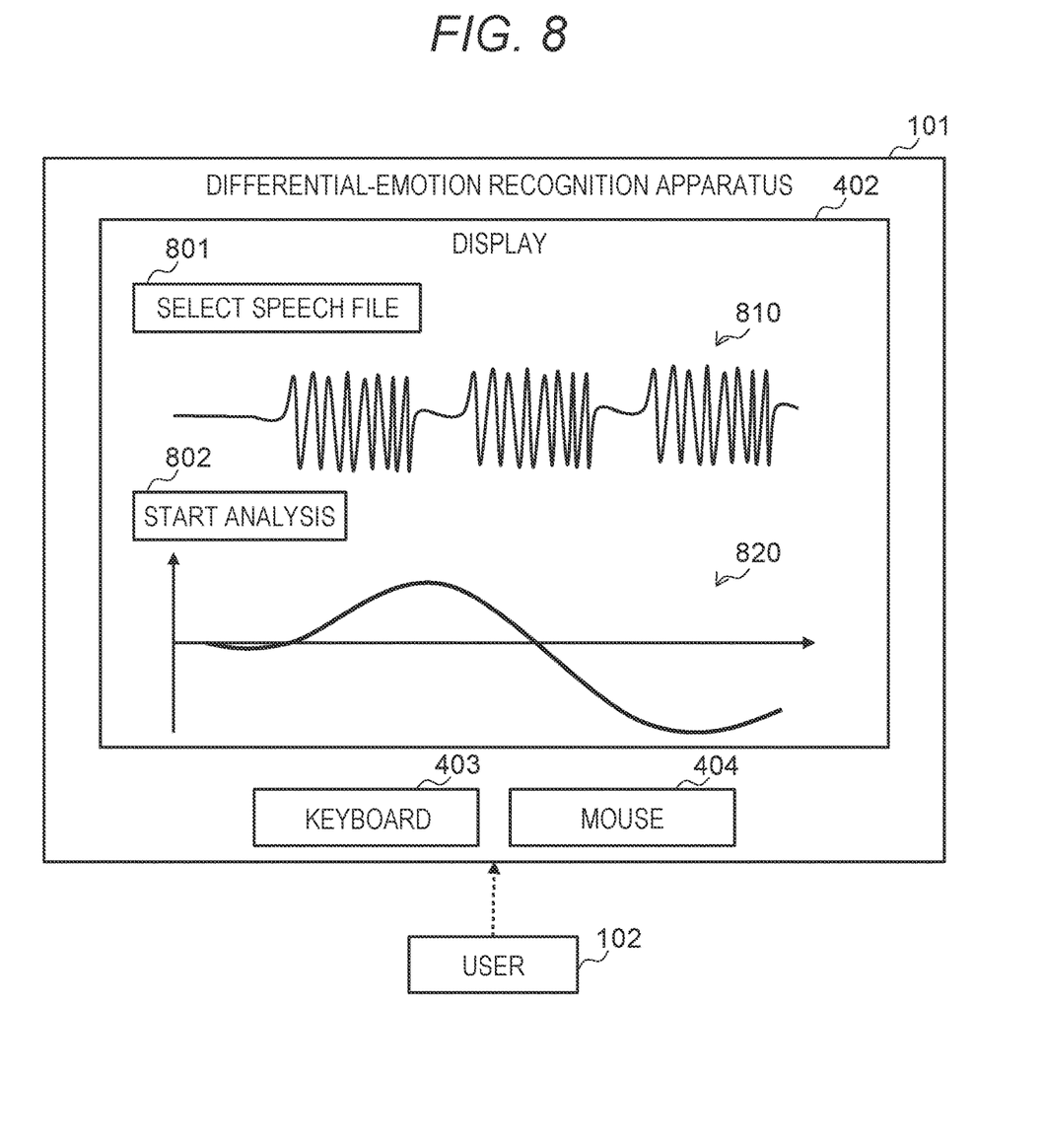
FIG. 8 is a diagram illustrating an example of a user interface according to the first embodiment.

FIG. 8 is a diagram illustrating an example of a user interface of the differential-emotion recognition apparatus 101.

The user 102 obtains, from the display 402, information that a continuous speech file to be input can be selected. When the user 102 operates the keyboard 403 and/or the mouse 404 to press a speech file selection button 801 and selects a speech file stored in the differential-emotion recognition apparatus 101, speech in the speech file is visualized on the display 402 as a waveform 810 and is stored in the storage device 400 as the continuous speech data 121. The user 102 can subsequently press an analysis start button 802 to run the differential-emotion recognition program 421. When the emotion transition data 122 is generated, emotion transition values are visualized on the display 402 as a graph 820.

Note that the emotion transition values are calculated for respective speech sections, and thus are smoothly connected in the graph 820 to show the emotion transitions in time series. For that matter, data to be visualized is not limited to the emotion transition values, and may be categories of emotion or a degree (differential-emotion value) for each emotion category.

The configuration of the emotion recognition system described above allows for a user to easily look at transition of emotions in speech of a specific speaker using the difference emotion recognition device based on the model that has learned the difference values of emotional expressions in speech.

(II) Second Embodiment

In the case of the conventional system designed to output absolute emotion assessment values (absolute values of emotion) for input speech, a user might input speech of different persons and use emotion assessment values of the speech for emotional assessments of the persons. In some cases, such usage is inappropriate since an output of an emotion recognition device reflects subjectivity of the minority and is not accurate enough as described above. As a main application, it is often sufficient to show a relative emotion change in speech of the same person by, for example, visualizing rise and fall of emotion expressions. However, a mechanism to limit application thereto is not provided.

Figure 9:
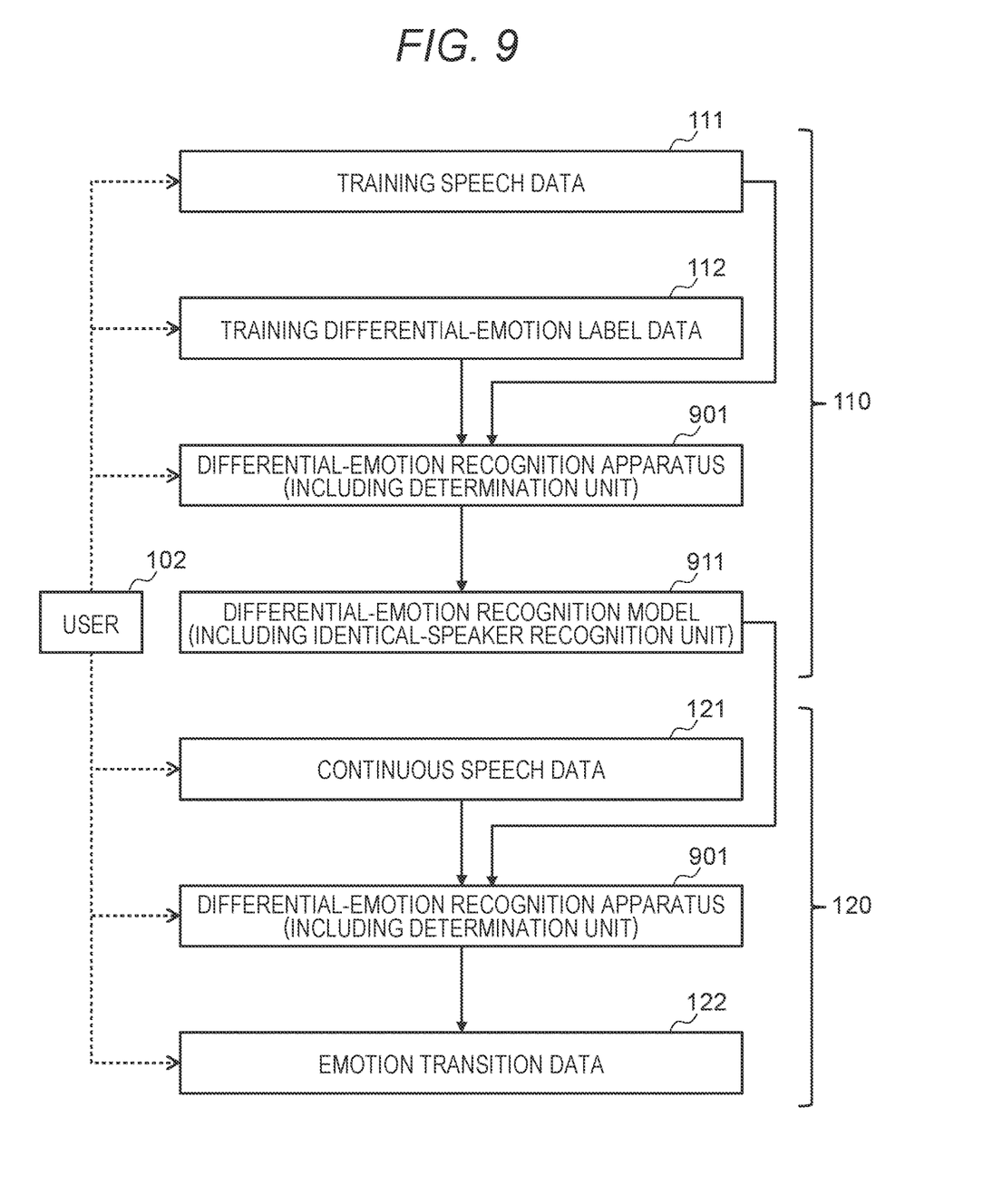
FIG. 9 is a diagram illustrating an example of a processing flow of a differential-emotion recognition apparatus according to a second embodiment.

In this regard, a differential-emotion recognition apparatus 901 according to the present embodiment determines whether two pieces of input speech data come from an identical speaker. In the present embodiment, the same configurations as those of the first embodiment are denoted by the same reference signs, and the description thereof will be omitted.

FIG. 9 is a diagram illustrating an example of a processing flow of the differential-emotion recognition apparatus 901 according to the present embodiment.

A differential-emotion recognition model 911 according to the present embodiment includes an identical-speaker recognition unit and has, as an output layer, an output z in addition to an output y. The output z, which represents an identical-speaker determination value, is "1" when a first speech pattern and a second speech pattern come from an identical speaker, and "0" when the first speech pattern and the second speech pattern do not come from an identical speaker. The output z is calculated by (Expression 3).

[Mathematical formula 3]

$$z = s\left(\sum_i (W_i^3 h_i + b_i^3)\right) \quad \text{(Expression 3)}$$

Note that the differential-emotion recognition model 911 has parameters $W_{ij}^1$, $b_i^1$, $W_i^2$, $b_i^2$, $W_i^3$, and $b_i^3$.

In the training program 411, when training is performed using training speech data 111 and training differential-emotion label data 112 similar to those in the first embodiment, a label z is set to "1". In addition, any two pieces of speech data having different speaker IDs are retrieved from the training speech data 111. Then, a label y is set to a random value (value unrelated to a differential emotion of the training differential-emotion label data 112), and the label z is set to "0" to update the parameters.

In the differential-emotion recognition program 421, when an emotion transition is calculated, speakers are determined not to be identical by an identical-speaker determination value less than a threshold. In a case where a pair of which speakers are determined not to be identical accounts for a certain ratio or more of all the pairs, the emotion transition is an invalid value. When emotion transitions are visualized by the display 402, an indication that the emotion recognition is invalid is displayed for a result of the speech section of the invalid value. For that matter, the differential-emotion recognition program 421 may stop the analysis in a case where an emotion transition is an invalid value.

Note that the present embodiment is not limited to the configuration in which the differential-emotion recognition model 911 includes the identical-speaker recognition unit. For example, the differential-emotion recognition apparatus 901 may include the differential-emotion recognition model 113 and an identical-speaker recognition unit (for example, an identical-speaker recognition model of a neural network).

The configuration of the emotion recognition system described above prevents a user from obtaining a result in a case where the user attempts the emotion recognition for speech including speech patterns of different speakers. As a result, it is possible to avoid the usage in which emotion assessment values obtained when speech of different persons is input are regarded as emotional assessments of the persons.

(III) Supplementary Notes

The above-described embodiments include, for example, the following contents.

In the above embodiments, a case where the present invention is applied to an emotion recognition system has been described. However, the present invention is not only applied to such a system but also can be widely applied to other various systems, apparatuses, methods, and programs.

In the above embodiments, a process is sometimes described with a "program" as the subject. However, the subject of the process may be a processor unit since the program is executed by the processor unit to perform the defined process appropriately using a storage unit (for example, a memory), an interface unit (for example, a communication port), and/or the like. A process described with a program as the subject may be a process performed by the processor unit or by a device having the processor unit. Furthermore, the processor unit may include a hardware circuit that performs a part or all of the process (for example, a field-programmable gate array (FPGA) or an application specific integrated circuit (ASIC)).

In the above embodiments, a part or all of the programs may be installed from a program source into an apparatus such as a computer that implements the differential-emotion recognition apparatus. The program source may be, for example, a program distribution server connected via a network or a computer-readable recording medium (for example, a non-transitory recording medium). Furthermore, in the above description, two or more programs may be implemented as one program, or one program may be implemented as two or more programs.

In the above embodiments, the configuration of each table is an example, and one table may be divided into two or more tables, or two or more tables may be combined into one table in whole or in part.

In the above embodiments, the screen illustrated and described is an example, and any design may be employed as long as the same information can be received.

In the above embodiments, the screen illustrated and described is an example, and any design may be employed as long as the same information can be presented.

In the above embodiments, the case where the average value is used as the statistical value has been described.

However, the statistical value is not limited to the average value, and may be another statistical value such as a maximum value, a minimum value, a difference between the maximum value and the minimum value, a mode value, a median value, or a standard deviation.

In the above embodiments, information is not always output by being displayed on the display. The information may be output as audio output by a speaker, may be output to a file, may be output by being printed on a paper medium or the like by a printing apparatus, may be output by being projected on a screen or the like by a projector, or may be output in another mode.

In the above description, information such as programs, tables, and files for implementing the functions may be stored in a storage device such as a memory, a hard disk, and a solid state drive (SSD), or in a recording medium such as an IC card, an SD card, and a DVD.

The above-described embodiments have, for example, the following characteristic configurations.

(1)

An emotion recognition system (for example, the differential-emotion recognition apparatus 101, the differential-emotion recognition apparatus 901, a system including the differential-emotion recognition apparatus 101 and a computer capable of communicating with the differential-emotion recognition apparatus 101, or a system including the differential-emotion recognition apparatus 901 and a computer capable of communicating with the differential-emotion recognition apparatus 901) includes: an input unit (for example, the differential-emotion recognition program 421, the input unit 422, or a circuit) configured to input first speech data and second speech data; and a processing unit (for example, the differential-emotion recognition program 421, the processing unit 423, or a circuit) configured to input the first speech data and the second speech data to a differential-emotion recognition model (for example, the differential-emotion recognition model 113 or the differential-emotion recognition model 911) that infers a differential emotion between two pieces of speech data, and acquire, from the differential-emotion recognition model, differential-emotion information indicating a differential emotion between the first speech data and the second speech data.

Note that the first speech data and the second speech data may be included in one speech data source (for example, the continuous speech data 121) or may be derived from separate speech data sources.

In the above configuration, for example, since the differential emotion (that is, relative emotion) is inferred from the two pieces of speech data, an emotion recognized by the emotion recognition system can be closer to an actual user impression than an emotion inferred from one piece of speech data (that is, absolute emotion).

(2)

The emotion recognition system further includes: a determination unit (for example, the differential-emotion recognition program 421 including the determination unit, the determination unit, or a circuit) configured to input the first speech data and the second speech data to an identical-speaker recognition unit (for example, the differential-emotion recognition model 911 or the identical-speaker recognition unit) that infers whether speakers of two pieces of speech data are identical, acquire, from the identical-speaker recognition unit, determination information indicating that a speaker of the first speech data and a speaker of the second speech data are identical (for example, "0" for indicating they are not identical or "1" for indicating they are identical, or a value from "0" to "1"), and determine whether the speaker of the first speech data and the speaker of the second speech data are identical according to the acquired determination information; and an output unit (for example, the differential-emotion recognition program 421 including the determination unit, the output unit 424, or a circuit) configured to output information according to a result of determination by the determination unit.

According to the above configuration, it is determined whether the speakers of the two pieces of speech data are identical. This allows for avoiding incorrect usage in which, for example, speech of different persons is input for emotional assessments of the persons.

(3)

The output unit is configured to, when the determination unit determines that the speaker of the first speech data and the speaker of the second speech data are identical, output the differential-emotion information (for example, the graph 820) acquired by the processing unit, and the output unit is configured to, when the determination unit determines that the speaker of the first speech data and the speaker of the second speech data are not identical, output information that the first speech data and the second speech data do not come from an identical speaker (for example, "A speech section of which speakers are not identical is included. This speech section is hidden in the graph.").

According to the above configuration, for example, a mechanism to reject comparison between speech patterns of different persons can be provided.

(4)

The input unit is configured to input continuous speech data (for example, the continuous speech data 121), and the processing unit is configured to detect at least one speech section from the continuous speech data input by the input unit, extract a piece of speech data of each of the at least one speech section from the continuous speech data, select, out of extracted pieces of speech data, a first piece of speech data and a second piece of speech data within a predetermined time interval from the first piece of speech data, input the first piece of speech data and the second piece of speech data to the differential-emotion recognition model, and acquire differential-emotion information indicating a differential emotion between the first piece of speech data and the second piece of speech data (for example, see FIG. 6).

According to the above configuration, when the continuous speech data is input, for example, the differential-emotion information indicating the differential emotion between the two adjacent pieces of speech data is sequentially acquired, so that the user can grasp transition of emotions.

(5)

The differential-emotion recognition model is trained by using two pieces of speech data of a same person and differential-emotion information indicating a differential emotion between the two pieces of speech data (see FIG. 5).

In the above configuration, labeling is performed on the two pieces of speech data of the same person. Therefore, for example, a labeler easily estimates emotions, and likelihood of labels depending on subjectivity of the labeler can be reduced.

(6)

When the identical-speaker recognition unit is trained by using two pieces of speech data, differential-emotion information indicating a differential emotion between the two pieces of speech data, and information indicating whether speakers of the two pieces of speech data are identical, in a case where the two pieces of speech data come from different persons, training is performed by changing the differential-emotion information indicating the differential emotion between the two pieces of speech data to a value (for example, a random value) unrelated to the differential-emotion information.

According to the above configuration, for example, the differential-emotion recognition model and the identical-speaker recognition unit can be trained by using common data, so that a burden of preparing data used for training can be reduced.

(7)

The differential-emotion recognition model is a neural network.

In the above configuration, since the differential-emotion recognition model is a neural network, it is possible to reduce likelihood of a rule functioning incorrectly due to the influence of variable factors of speaker characteristics such as a voice tendency to be muffled and a high voice, environmental characteristics such as large reverberation, and the like. It is also possible to improve the inference accuracy.

In addition, the above configurations may be appropriately changed, rearranged, combined, or omitted without departing from the gist of the present invention.

It should be understood that items included in a list in the format "at least one of A, B, and C" can mean (A), (B), (C), (A and B), (A and C), (B and C), or (A, B, and C). Similarly, items listed in the format "at least one of A, B, or C;" can mean (A), (B), (C), (A and B), (A and C), (B and C), or (A, B, and C).

What is claimed is:

1. An emotion recognition system comprising:
a processor; and
a memory coupled to the processor, the memory storing instructions that when executed by the processor, configures the processor to:
receive an input of continuous speech data,
detect a first speech section and a second speech section of the continuous speech data,
extract, from the first section and the second speech section, first speech data and second speech data, respectively, the second speech data being within a predetermined time interval from the first speech data,
input the first speech data and the second speech data to a differential-emotion recognition model that infers a differential emotion between two pieces of speech data,
acquire, from the differential-emotion recognition model, differential-emotion information indicating a differential emotion between the first speech data and the second speech data,
obtain emotion transition information of the second speech section based on a predetermined emotion transition of the first speech section and the differential-emotion information,
wherein the differential-emotion recognition model is a neural network in which a number of states of an input layer is a number equal to a sum of a number of features of a first speech pattern of the first speech section and a number of features of a second speech pattern of the second speech section, a number of hidden layers is one, a number of states of an output layer is one, and an output of the output layer represents a difference value of emotion of the second speech pattern relative to the first speech pattern.

2. The emotion recognition system according to claim 1, wherein the processor is configured to:
execute an identical-speaker recognition model, which is a neural network, and train the identical-speaker recognition model,
determine whether speakers of the first speech data and the second speech data are identical, and
output information according to a result of the determination.

3. The emotion recognition system according to claim 2, wherein the processor is configured to, upon determining that the speaker of the first speech data and the speaker of the second speech data are identical, output the differential-emotion information, and upon determining the speaker of the first speech data and the speaker of the second speech data are not identical, output information that the first speech data and the second speech data do not come from an identical speaker.

4. The emotion recognition system according to claim 1, wherein the processor is configured to train the differential-emotion recognition model using two pieces of speech data of a same person and differential-emotion information indicating a differential emotion between the two pieces of speech data.

5. The emotion recognition system according to claim 2, wherein the processor is configured to, when the identical-speaker recognition model is trained by using two pieces of speech data, differential-emotion information indicating a differential emotion between the two pieces of speech data, and information indicating whether speakers of the two pieces of speech data are identical, and in a case where the two pieces of speech data come from different persons, training is performed by changing the differential-emotion information indicating the differential emotion between the two pieces of speech data to a value unrelated to the differential-emotion information.

6. An emotion recognition method comprising:
receiving an input of continuous speech data;
detecting a first speech section and a second speech section of the continuous speech data;
extracting, from the first section and the second speech section, first speech data and second speech data, respectively, the second speech data being within a predetermined time interval from the first speech data;

inputting the first speech data and the second speech data to a differential-emotion recognition model that infers a differential emotion between two pieces of speech data;

acquiring, from the differential-emotion recognition model, differential-emotion information indicating a differential emotion between the first speech data and the second speech data; and obtaining emotion transition information of the second speech section based on a predetermined emotion transition of the first speech section and the differential-emotion information, wherein the differential-emotion recognition model is a neural network in which a number of states of an input layer is a number equal to a sum of a number of features of a first speech pattern of the first speech section and a number of features of a second speech pattern of the second speech section, a number of hidden layers is one, a number of states of an output layer is one, and an output of the output layer represents a difference value of emotion of the second speech pattern relative to the first speech pattern.

7. The emotion recognition method according to claim 6, further comprising:

determining whether speakers of the first speech data and the second speech data are identical; and outputting information according to a result of the determination.

8. The emotion recognition method according to claim 7, wherein upon determining the speaker of the second speech data are identical, output the differential-emotion information, and upon determining the speaker of the first speech data and the speaker of the second speech data are not identical, the output unit outputs information that the first speech data and the second speech data do not come from an identical speaker.

9. The emotion recognition method according to claim 6, wherein the differential-emotion recognition model is trained by using two pieces of speech data of a same person and differential-emotion information indicating a differential emotion between the two pieces of speech data.

10. The emotion recognition method according to claim 7, wherein when the identical-speaker recognition model is trained by using two pieces of speech data, differential-emotion information indicating a differential emotion between the two pieces of speech data, and information indicating whether speakers of the two pieces of speech data are identical, and in a case where the two pieces of speech data come from different persons, training is performed by changing the differential-emotion information indicating the differential emotion between the two pieces of speech data to a value unrelated to the differential-emotion information.

* * * * *